United States Patent [19]

Reh

[11] Patent Number: 5,522,688
[45] Date of Patent: Jun. 4, 1996

[54] AUTOMATIC SPACE TAKE-UP DEVICE FOR TIE DOWN BOLTS

[76] Inventor: Carter K. Reh, 13312 Loretta Dr., Santa Ana, Calif. 92705

[21] Appl. No.: 323,743

[22] Filed: Oct. 17, 1994

[51] Int. Cl.⁶ ............................. F16B 43/00; F16B 43/02
[52] U.S. Cl. ........................................... 411/536; 411/546
[58] Field of Search ................................... 411/149, 231, 411/350, 535, 536, 546

[56] References Cited

U.S. PATENT DOCUMENTS

| | | | |
|---|---|---|---|
| 1,746,978 | 2/1930 | Winkler | 411/536 |
| 1,966,780 | 7/1934 | Wyrick | 411/536 |
| 3,830,484 | 8/1974 | Bright et al. | 411/350 X |
| 5,180,268 | 1/1993 | Richardson | 411/536 |

*Primary Examiner*—Neill R. Wilson
*Attorney, Agent, or Firm*—Plante & Strauss

[57] ABSTRACT

There is disclosed an automatic space take-up device which comprises a pair of generally cylindrical and axially aligned bodies, each having a central through aperture, with a flat base at their outer ends, and having opposed inclined ramps, with a cylindrical sleeve receiving and surrounding the bodies, and a torsion spring received within the central aperture of the bodies and secured at its opposite ends to a respective one of said bodies. One of the bodies is permanently attached to the sleeve and the other body is rotationally and axially moveable within said sleeve and is biased axially outwardly by the torsion spring. The take-up device also includes aligned apertures in the moveable body and in the sleeve with a lock pin removably received in said aligned apertures to restrain said moveable body against the resilient bias of said torsion spring. In its preferred embodiment, each of the bodies of the take-up device is provide with inner and outer inclined ramps, with the inner ramps concentrically located within the outer pair and at 180 degree angular spacing thereto, to provide stability to the take-up device throughout its entire expandable length.

7 Claims, 4 Drawing Sheets

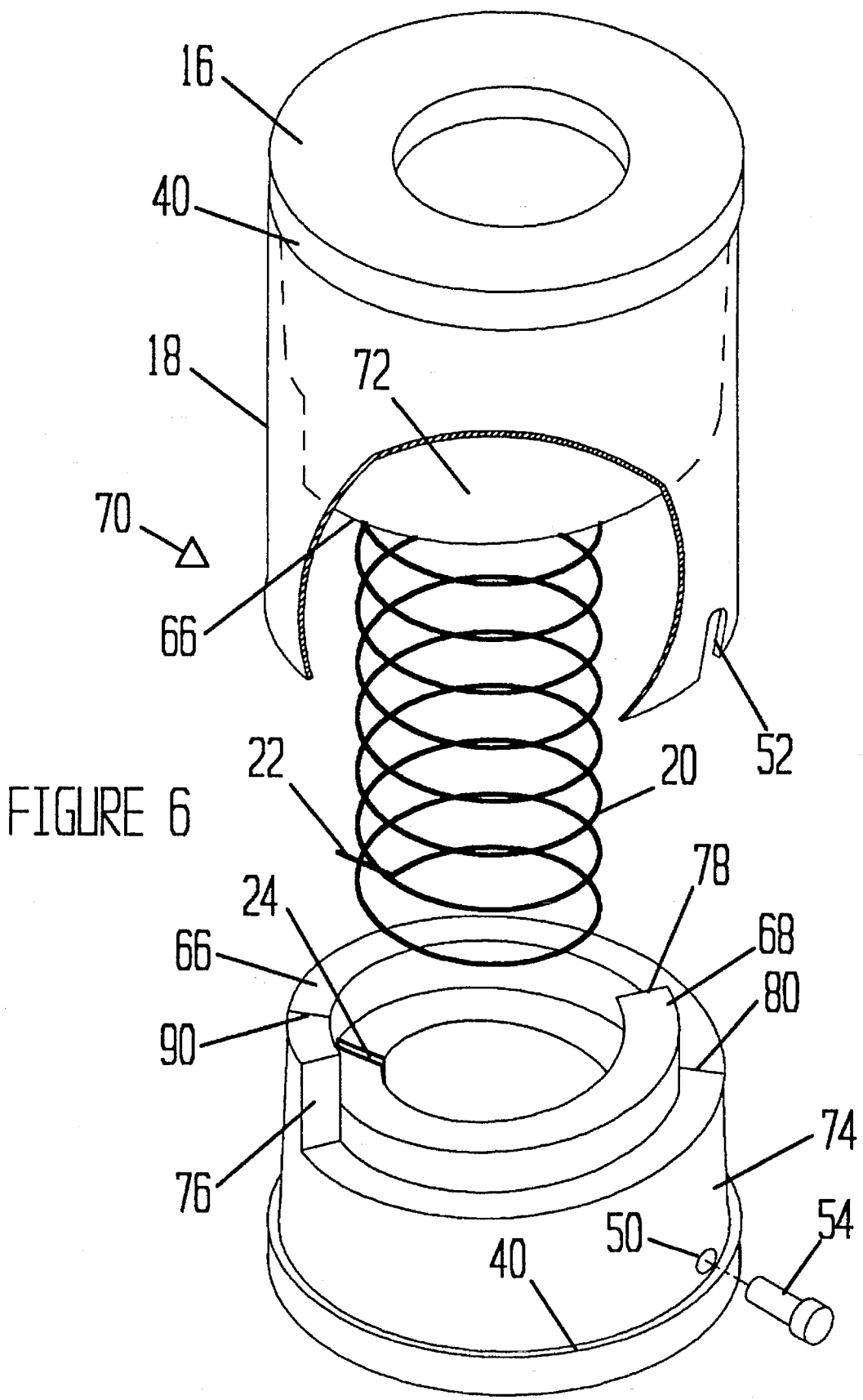

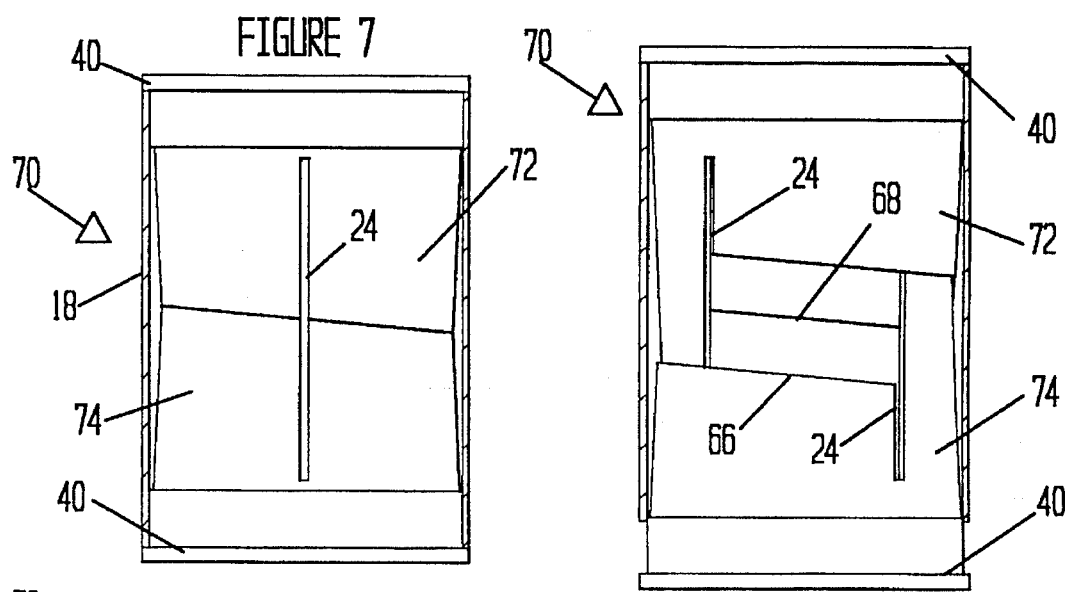
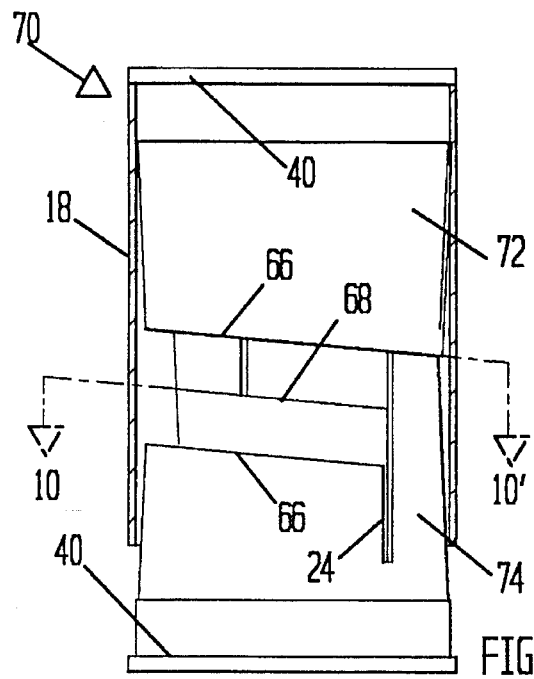
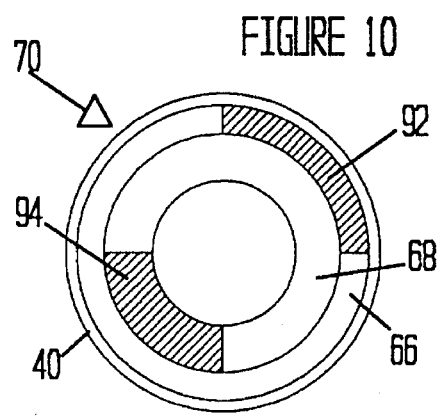

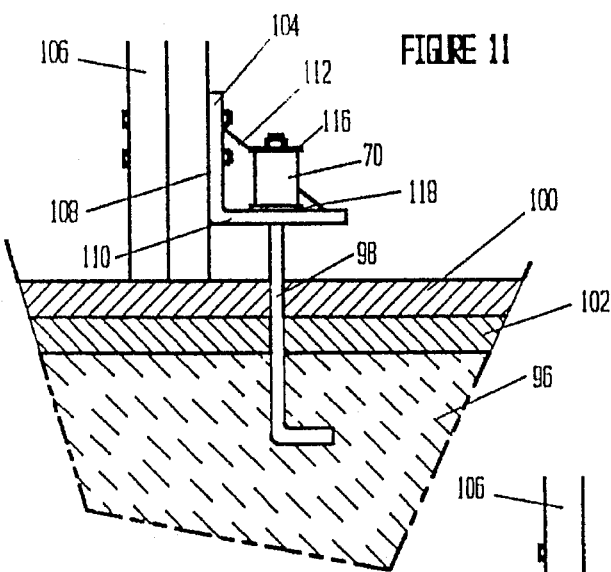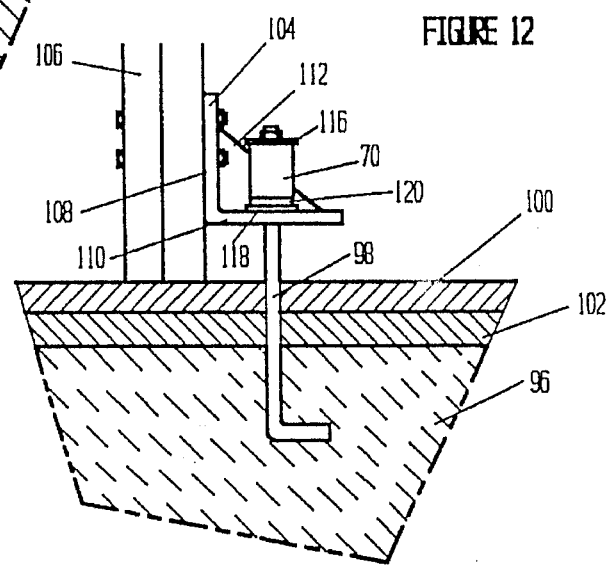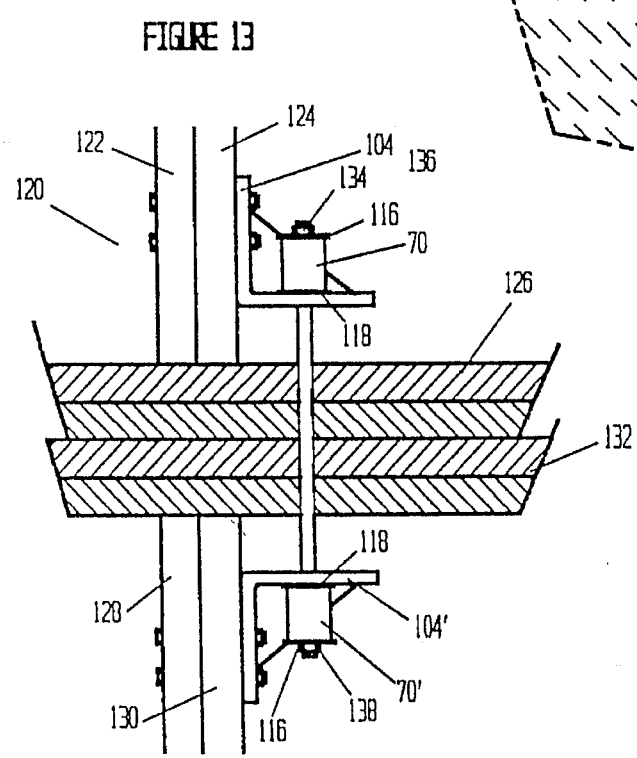

AUTOMATIC SPACE TAKE-UP DEVICE FOR TIE DOWN BOLTS

BACKGROUND OF THE INVENTION

1. Field of Invention

This invention relates to an automatic space take-up device to maintain security of a fastener, and in particular to an automatic space take-up device useful to maintain tension on tie down bolts of buildings.

2. Brief Description of the Prior Art

Most building codes require the use of tie down bolts to secure a building to its foundation, and to secure upper story wall panels to lower story panels in multiple story buildings. These bolts are usually secured to the wall panels of a building with tie-down brackets, or penetrate the plates of a wall panel, and are tightly secured with conventional nut fasteners.

Unfortunately, structural lumber is not dimensionally stable, and shrinks over a period of time, sometimes as much as ⅜ inch, resulting in a loosening of the tie down bolts. Unless some corrective measures are taken, the resultant loosening of the tie down bolts, permits an intolerable rocking of the wall panels during earthquakes, which concentrates destructive forces at the corners of the wall panels, resulting in structural failure of the wall panels. The tie down fasteners, however, are often in inaccessible locations and routine inspection and maintenance are not possible, or even when the fasteners are accessible, are usually overlooked.

Some prior attempts have been made to provide self-expanding washers to accommodate shrinkage in structural lumber. An example of an attempt is shown in U.S. Pat. No. 5,180,268, in which an expandable washer is provided in two expandable parts with a stepped ramp or cam surface. The parts are biased axially apart by a torsional spring. Successful acceptance of this type of adjustable washer depends on its ease of installation, and its ability to maintain integrity over use, free from dirt, debris and insect invasion which can compromise its functioning. The aforementioned patent discloses a pair of retainer clips which hook about opposite sides of the washer, and which are to be removed after its installation. These retainers, however, are difficult to remove from an installed and tensioned installation. Additionally, the washer lacks insect and debris shielding to insure its integrity throughout its useful life. Additionally, the stepped ramp is not infinitely adjustable, but only provides preset incremental tension adjustment.

Another expandable washer is shown in U.S. Pat. No. 4,433,879. This washer lacks a resilient biasing spring, and requires manual adjustment, a requirement which limits its usefulness because of the inaccessibility of most building tie down installations. This washer, as that of the previously mentioned '268 patent is not infinitely adjustable.

Another application of helical ramps in washers is shown in U.S. Pat. No. 4,708,555 in which helical ramps are used to provide a lock washer which is also provided with a helical spring to bias the washer into a locking position.

Various self-expanding washers or shims have been provided in machine applications, usually as seals or retainers for bearings of rotational shafts. Examples of these can be found in U.S. Pat. Nos. 3,285,568, 2,405,889, 1,966,780, 1,953,354, 1,746,978 and 1,347,687. These washers or shims lack retainers to maintain the washer in its compressed configuration during installation, and also lack shielding necessary to prevent infiltration of dirt and insects.

Objectives Of This Invention

It is an objective of this invention to provide an automatic space take-up device useful in building tie-down applications.

It is a further objective of this invention to provide an automatic space take-up device which automatically retains tension on a fastener.

It is a still further objective of this invention to provide an automatic space take-up device having an infinite adjustment capability throughout its expansion.

It is an additional objective of this invention to provide an automatic space take-up device which includes a retainer to maintain the device in its compressed configuration that can be readily removed after installation without compromising the installation tension.

It is also an objective of this invention to provide an automatic space take-up device which has adequate shielding to prevent infiltration of debris and insects over its prolonged life.

It is likewise an objective of this invention to provide an automatic space take-up device which remains stable and useful throughout its expansion.

Other and related objectives will be apparent from the following description of the invention.

BRIEF DESCRIPTION OF THE INVENTION

This invention is an automatic space take-up device which comprises a pair of generally cylindrical and axially aligned bodies, each having a central through aperture, with a flat base at their outer ends, and having opposed inclined ramps, with a cylindrical sleeve receiving and surrounding the bodies, and a torsion spring received within the central through aperture of the bodies and secured at its opposite ends to a respective one of said bodies. One of the bodies is permanently attached to the sleeve and the other body is rotationally and axially moveable within said sleeve and is biased axially outwardly by the torsion spring. The device also includes aligned apertures in the moveable body and in the sleeve with a lock pin removably received in said aligned apertures to restrain said moveable body against the resilient bias of said torsion spring. In its preferred embodiment, each of the bodies of the device is provide with inner and outer inclined ramps, with the inner ramps concentrically located within the outer pair and at 180 degree angular spacing thereto, to provide stability to the device throughout its entire expandable length.

BRIEF DESCRIPTION OF THE DRAWINGS

The invention will be described with reference to the figures, of which:

FIG. 6 is an exploded perspective view of a preferred embodiment of the take-up device of this invention;

FIG. 7 is an elevational view of the assembled take-up device shown in FIG. 6 in its compact configuration, ready to be installed in a typical tie down application;

FIG. 8 is an elevational view of the assembled take-up device of FIG. 6, illustrating its expansion through approximately ¾ of its expandable range;

FIG. 9 is an elevational view of the assembled take-up device of FIG. 6, illustrating its maximum expansion;

FIG. 10 is a view along a sectional plane lying on the helical ramp of the take-up device, as represented by line 10–10' of FIG. 9;

FIG. 11 illustrates a typical tie-down installation of the take-up device of the invention with a conventional tie-down bracket; and FIG. 12 illustrates the tie-down installation of FIG. 11 after shrinkage of the structural wood members; and FIG. 13 illustrates a typical tie-down installation of the take-up device of the invention as applied between stories of a multiple story building.

DESCRIPTION OF THE PREFERRED EMBODIMENT

There are a number of significant requirements for an expandable take-up device which is to be applied to building tie-down installations. The amount of shrinkage which can be experienced with most structural lumber can be up to 0.250 inch, and in some applications can be as great as 0.375 inch. Accordingly, the take-up device should be capable of at least 0.275 inch axial expansion, and preferably up to 0,375 inch axial expansion. The outer dimensions of the take-up device are also limited to permit it to be used with conventional tie-down brackets. The take-up device must only be expandable, and must be able to resist contraction, even under high stress loadings which occur during earthquakes. Since the take-up device will be used in locations which are not accessible for routine servicing and maintenance, the ramp surfaces of the take-up device must be protected against infiltration by debris and insects to insure operation throughout the life of the building. Finally, the take-up device must be easy to install to insure that construction workers do not ignore its use.

Figure 1:
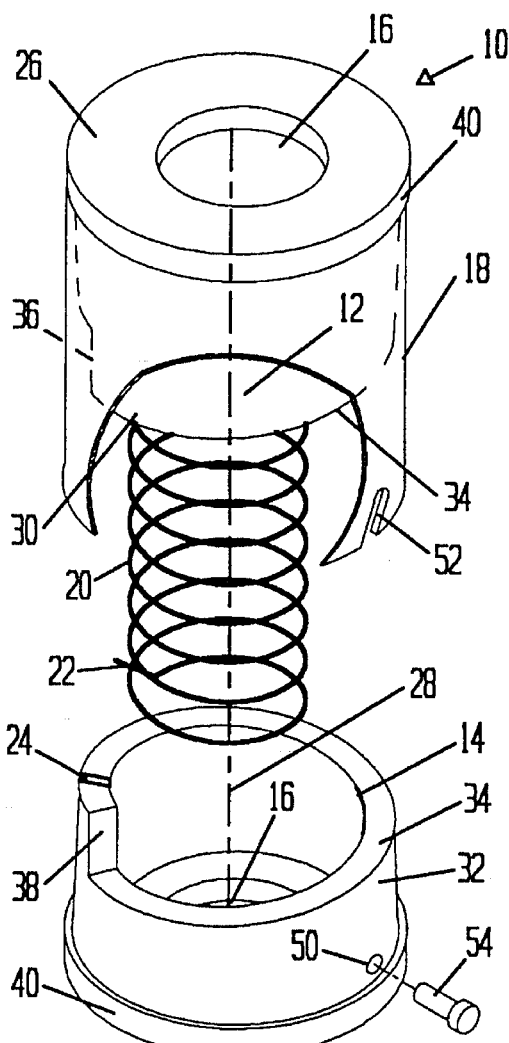
FIG. 1 is an exploded perspective view of an automatic space take-up device of the invention.

The self-expanding take-up device 10 of the invention which meets all these requirements is illustrated in exploded view in FIG. 1. The take-up device 10 is formed of two substantially identical and opposed generally cylindrical bodies 12 and 14 having a central through aperture 16. The bodies 12 and 14 are assembled in opposed axial alignment within a surrounding sleeve 18, and a coil spring 20 is received within the central through aperture 16 of the bodies 12 and 14 to bias them in relative rotational movement. For this purpose, the spring has its opposite ends affixed to each of the bodies, preferably with a tang 22 at each end which is received within an axial slot 24 in each of the bodies 12 and 14.

The take-up device bodies 12 and 14 have outer ends which have substantially flat or planar surfaces such as 26 which are orthogonal to the longitudinal axis 28 of the assembly. At their opposite, or inner ends 30 and 32, each of the bodies has a helical ramp 34 which extends substantially about the body (360 degrees), thereby providing cam surfaces which terminate in substantially axial walls 36 and 38. The two bodies are aligned in the assembly with their inclined ramps in mating, opposed contact, as shown in FIG. 1. The pitch of the helical ramp is sufficiently shallow that compressive loadings placed on the take-up device will not cause it to retract. The pitch, however, is sufficient to provide at least 0.25 inch total expansion through a rotational displacement of 180 degrees. For most applications, with tie-down bolts of 0.25 to 0.375 inch, the outer diameter of the take-up device can from 1.25 to 1.75 inch, preferably 1.5 inch, and the pitch angle of the ramp can be from 3 to about 10 degrees, preferably from 4 to about 6 degrees.

Preferably each of the bodies 12 and 14 has an annular flange or rim 40 about its base, which provides an annular shoulder that serves as an axial stop for the sleeve 18. The sleeve serves as a protective housing for the assembly, insuring that no debris or insects can invade the assembly and become lodged between the cam surface.

One of the bodies, 12, is permanently affixed to the sleeve, by press-fit adhesives, welding, or screw fasteners. The other body, 14, is rotationally and axially moveable within the sleeve 18.

A coil spring 20 serves as a resilient torsion member and for this purpose, its opposite ends are affixed to each of the bodies. Preferably the ends of the spring have radial tangs 22 which are received in an axial slot 24 in the wall of each of the bodies.

The moveable body also has a recess 50 in its outer wall, and this recess aligns, in the assembly, with a slot 52 in the end of the sleeve 18. A pin 54 is removable seated in the aperture 50 when the assembly is in its compressed configuration to restrain the moveable body 14 against movement. After a worker installs the tie-down fastener, the pin 54 is pulled, releasing the spring tension to provide a continuous biasing force on the fastener throughout its useful life. The application of tension to the tie-down bolts by nut fasteners during installation releases the shear force applied to the removable retainer pins, permitting their extraction from the assembly, and releasing the torsional loading of the coil spring to impart rotational movement to the moveable member, which under the action of the inclined cam surfaces of the opposed ramps, expands the take-up device. In this manner, the self-expanding take-up device remains under load and the tension on the tie down bolts is maintained throughout the entire life of the take-up device. The aperture in the sleeve can be an inclined slot which is inclined in a direction opposite the resilient bias of the spring. Since this pin retainer is contained within the axial length of the take-up device, and has no flange which lies outside the bases of the bodies, full tension can be applied to the nut fastener of the tie down bolts during installation prior to extraction of the retainer pin. In fact, the application of full tension to the take-up device facilitates extraction of the pin, as the tension on the pin is released by application of the nut fastener.

Figure 2:
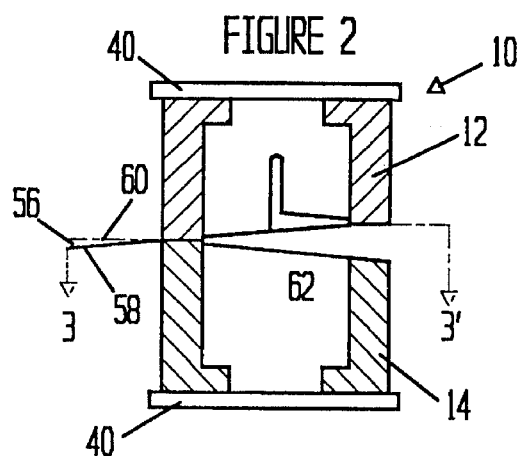
FIG. 2 is an elevational view of the assembled take-up device shown in FIG. 1 in an expanded configuration.
Figure 3:
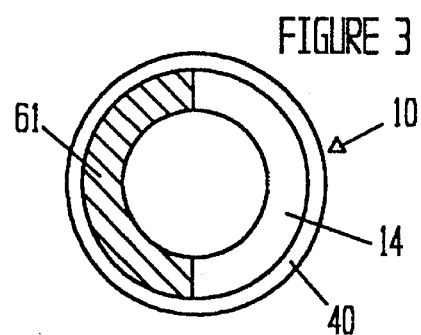
FIG. 3 is a view along a plane lying on the helical ramp of the take-up device, as represented by line 3–3' of FIG. 2.

FIG. 2 illustrates the expansion of the self-expanding take-up device 10 of FIG. 1. The pitch angle 56 is shown as the included angle between a projection of the ramp surface 58 and a radial 60 of the generally cylindrical body 12. The self-expanding take-up device 10 is shown at its maximum useful expansion 62. At this extent of expansion, the moveable body 14 of the take-up device has rotated through an angular increment of 180 degrees, and extended axially within the sleeve 18. The two bodies 12 and 14 remain engaged along 180 degrees of their ramp surfaces, as indicated by the shaded area 61 of the ramp surface, shown in FIG. 3.

Figure 5:
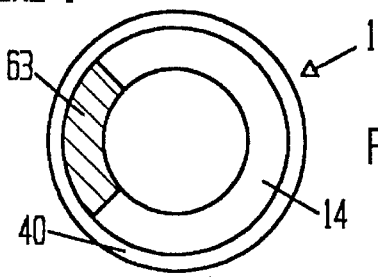
FIG. 5 is a view along a plane lying on the helical ramp of the take-up device, as represented by line 5–5' of FIG. 4.
Figure 4:
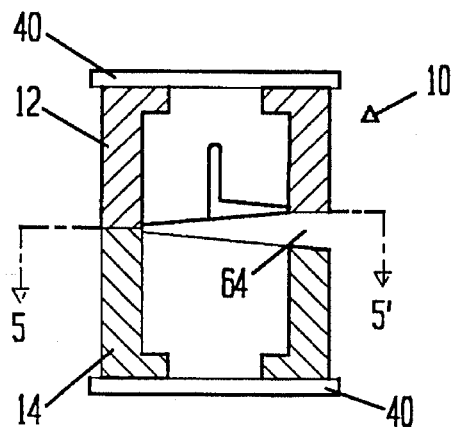
FIG. 4 is an elevational view of the assembled take-up device shown in FIG. 1 in its maximum, expanded configuration.

FIG. 4 illustrates an extreme expansion 64 of the take-up device 10, in which the moveable body 14 has rotated through an arc of 270 degrees. The two bodies 12 and 14 are in contact along only 90 degrees of the ramp surface, as indicated by the shaded area shown in FIG. 5. While this may be useful in some applications, it is preferred to limit the use of the single ramp design shown in FIGS. 1–5 to installations which will not require axial displacements greater than that shown in FIGS. 2 and 3, because there is a potential instability of the take-up device 10 when the engagement surface of the bodies 12 and 14 is less than about 180 degrees.

FIGS. 6–10 illustrate the preferred embodiment of the expandable take-up device 70 which has a greater range of expansion. This embodiment provides two helical ramps 66 and 68 to each body arrayed at 180 degree angular increments. This assembly is preferred for stability, particularly at full or substantially full expansions of the take-up device 70.

As illustrated in FIG. 6, the take-up device 70 has two generally cylindrical bodies 72 and 74, each of which has concentric helical ramps 66 and 68 which terminate in axial walls 76 and 78. The outer ramps 66 are substantially identical to the ramps 34 described and illustrated in FIGS. 1–5. The inner ramps 68 are concentric with and located interiorly of the outer ramps 66, and are oriented at 180-degrees angular increment to outer ramps 66. Preferably, the inner ramps 66 have a greater width 80 than the width 90 of the outer ramps 66 so that the surface areas of ramps 66 and 68 are substantially equal.

As the ramps are at 180-degree angular increment, the two bodies 72 and 74 will be in contact on opposite sides of the assembly, thereby insuring that the take-up device will remain stable throughout the full expansion of the assembly, avoiding any possible tilting or misalignment of the two bodies 72 and 74.

FIG. 7 illustrates the take-up device 70 in its compact configuration, with the outer sleeve 18 sectioned for illustration purposes. In this configuration, the bodies 72 and 74 are in contact throughout the entire surfaces of the helical ramps 66 and 68 (not shown).

FIG. 8 illustrates the take-up device 70 in a partially expanded configuration, in which the moveable body 74 has rotated through an angular increment of about 90 degrees, and has extended axially about 0.125 inch. The bodies 72 and 74 remain in contact along 270 degrees on each helical ramp 66 and 68.

FIG. 9 illustrates the take-up device 70 in a fully expanded configuration in which the moveable body 74 has rotated through an angular increment of 270 degrees and extended axially 0.375 inch. As shown in FIG. 10, the bodies 72 and 74 remain in contact through surfaces 92 and 94 extending 90 degrees along each of the ramps 66 and 68. The contact surfaces 92 and 94 are at opposite sides of the take-up device 70, insuring its stability under compressive loading, and the combined surfaces 92 and 94 provide sufficient area to maintain the compressive loading below that which could cause structural failure of the take-up device 70.

FIGS. 11 and 12 illustrate a typical tie down installation for a building. The building rests on a concrete foundation 96 in which tie-down bolts 98 (commonly referred to as "J-bolts") have been installed at preset spacings. The bolts 98 extend upwardly through structural wood members (bottom plates) 100 and 102. Standard tie-down brackets 104 are bolted to the wall panels 106 of the building. These are angle brackets with a vertical leg 108 and a horizontal leg 110 reinforced with a fillet rib 112. The tie-down bolts 98 are received through an aperture in the horizontal legs 110 of the brackets 104, and the expandable take-up devices 70 of the invention are placed over the bolts 98 and secured with standard nuts 114. Preferably flat take-up devices 116 and 118 are placed at opposite ends of the expandable take-up devices 70.

The expandable take-up devices provide sufficient and infinite adjustment to retain compression even though the wood structural members, mostly the bottom plates 100 and 102, shrink during the life of the building. FIG. 11 illustrates the installation at the time of construction of the building, and FIG. 12 illustrates the installation after the structural members of the building have shrunk and the expandable take-up devices 70 have expanded, as shown by the extension 120 to the length of take-up device 70, to retain tension on the tie-down bolts 98.

Referring now to FIG. 13, the automatic space take-up device 70 of the invention is shown in a typical tie-down installation between stories of a multiple-story structure. The structure has an upper story 120 with wall panels 122 and 124, and a bottom plate 126 of a wood structural member resting on a lower story with wall panels 128 and 130 and a top plate 132 of a wood structural member. Tie-down brackets 104 are bolted to the wall panels 122 and 124 of the upper story at spaced increments along the length of the wall, and tie-down brackets 104' are similarly bolted to the wall panels 128 and 130 of the lower story. The tie-down brackets 104 and 104' are in alignment and receive a tie-down bolt 134 which is secured at its opposite ends with conventional nuts 136 and 138. An automatic space take-up device 70 of the invention is placed between the bracket 104 and the nut fastener 136, and preferably, flat washers 116 and 118 are placed at opposite ends of the take-up device 70. If desired, a second take-up device 70' is also used in the assembly on the opposite end 142 of the bolt 134.

The invention provides an assembly of an automatic space take-up device which is easy to install with adequate tension on the tie down bolts to insure that the building is tightly secured to its foundation throughout a useful life of 50 or more years. Since the ramps of the expandable take-up device are continuous and unbroken, the take-up devices provide infinite adjustment capability and maximum tension is always retained on the tie-down bolts. The protective housing formed by the sleeve of the assembly prevents infiltration of dust, debris or insects into the assembly, which contributes to a long useful life of the self-expanding take-up devices.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. An automatic space take-up device which comprises:
   a. first and second generally cylindrical bodies, each having a central through aperture, and a flat base at one end, and at its opposite end, an inclined helical ramp, extending through approximately 360 degrees, and having a pitch angle no greater than about 10 degrees to said flat base;
   b. a cylindrical sleeve receiving said first and second bodies oriented with their helical ramp ends in mating opposition within said sleeve to provide a bearing surface;
   c. a torsion spring received within the central through aperture of said bodies with its opposite ends secured to a respective one of said bodies, with one of said bodies permanently rotationally indexed to said sleeve and the other thereof rotationally and axially moveable within said sleeve; and d. an apertures in said moveable body and a second aperture in said sleeve opposite to and aligned with said first aperture, and a lock pin removably received in said aligned apertures to restrain said moveable body against the resilient bias of said torsion spring.

2. The take-up device of claim 1 wherein said torsion spring is a cylindrical coil spring.

3. The take-up device of claim 1 wherein said aperture in said sleeve is a slot inclined to the longitudinal axis of said sleeve.

4. The take-up device of claim 1 wherein said bodies have an annular flange at their base ends which abut against the opposite ends of said sleeve.

5. The take-up device of claim 1 wherein each of said bodies has an additional pair of inclined ramps of lesser diameter than said first pair of ramps, and concentric therewith and offset therefrom by a 180-degree angular increment, thereby providing four bearing surfaces between the opposed ends of said bodies.

6. The take-up device of claim 1 in combination with a building having a foundation wall and building member bottom plates resting on said foundation wall, with a plurality of tie-down bolts embedded in said foundation wall and extending through said building member bottom plates at spaced-apart increments and secured to structural members of said building with mechanical fasteners received on the upper ends of said tie bolts above said bottom plates, and with one each of said take-up devices received over said upper ends of said tie-down bolts with said moveable body of each take-up device released into rotational and axial movement under the resilient bias of said torsion spring.

7. The take-up device of claim 1 wherein each of said bodies has a second helical ramp, disposed concentric to and within said helical ramp and at 180 degree angular spacing thereto, whereby said first and second bodies remain in contact on opposite sides throughout the entire range of expansion of said take-up device.

* * * * *